United States Patent
Bichler et al.

(10) Patent No.: US 11,920,071 B2
(45) Date of Patent: Mar. 5, 2024

(54) YELLOW LUMINOPHORE AND LIGHT SOURCE

(71) Applicant: OSRAM Opto Semiconductors GmbH, Regensburg (DE)

(72) Inventors: Daniel Bichler, Augsburg (DE); Simon Dallmeir, Biessenhofen (DE); Christian Koch, Oberottmarshausen (DE); Simon Peschke, Assling (DE); Gudrun Plundrich, Landsberg am Lech (DE); Philipp Schmid, Germering (DE); Christiane Stoll, Schwabmuenchen (DE); Johanna Strube-Knyrim, Weil (DE); Jutta Thoma, Horgau (DE); Mark Vorsthove, Augsburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 92 days.

(21) Appl. No.: 17/616,689

(22) PCT Filed: Jun. 4, 2020

(86) PCT No.: PCT/EP2020/065505
§ 371 (c)(1),
(2) Date: Dec. 6, 2021

(87) PCT Pub. No.: WO2020/245282
PCT Pub. Date: Dec. 10, 2020

(65) Prior Publication Data
US 2022/0325175 A1    Oct. 13, 2022

(30) Foreign Application Priority Data
Jun. 6, 2019   (DE) ..................... 10 2019 208 285.8

(51) Int. Cl.
*C09K 11/77* (2006.01)
*F21S 41/16* (2018.01)
(Continued)

(52) U.S. Cl.
CPC ...... *C09K 11/7734* (2013.01); *C09K 11/7706* (2013.01); *F21S 41/16* (2018.01);
(Continued)

(58) Field of Classification Search
CPC ............ C09K 11/7728; C09K 11/7715; H01L 33/502
See application file for complete search history.

(56) References Cited

U.S. PATENT DOCUMENTS

2015/0123155 A1* 5/2015 Schmidt ............... H01L 33/502
                                                          252/301.4 F
2019/0144745 A1   5/2019 Seibald et al.
(Continued)

FOREIGN PATENT DOCUMENTS

DE   102016121604 A1   5/2018
WO     2018029304 A1   2/2018
(Continued)

OTHER PUBLICATIONS

International Search Report issued for the corresponding International application No. PCT/EP2020/065505, dated Sep. 14, 2020, 3 pages (for informational purposes only).
(Continued)

*Primary Examiner* — Andrew J Coughlin
(74) *Attorney, Agent, or Firm* — VIERING, JENTSCHURA & PARTNER MBB

(57) ABSTRACT

A luminophore having the general empirical formula $X'_{1-x}A'_y(Al_{1+z}A'_{3-z})O_4:E'$ that crystallizes in a tetragonal crystal system.
X' may be Mg, Ca, Sr, Ba, and combinations thereof;
(Continued)

A' may be Li, Na, K, Rb, Cs, and combinations thereof;
E' may be Eu, Ce, Yb, Mn, and combinations thereof;
$0 < x < 0.25$;
$y \leq x$; and
$z = 0.5(2x-y)$.

18 Claims, 4 Drawing Sheets

(51) Int. Cl.
| | |
|---|---|
| *F21S 41/176* | (2018.01) |
| *F21V 9/30* | (2018.01) |
| *F21V 14/08* | (2006.01) |
| *G02B 26/00* | (2006.01) |
| *F21Y 115/30* | (2016.01) |
| *G03B 21/20* | (2006.01) |

(52) U.S. Cl.
CPC ............ *F21S 41/176* (2018.01); *F21V 9/30* (2018.02); *F21V 14/08* (2013.01); *G02B 26/008* (2013.01); *F21Y 2115/30* (2016.08); *G03B 21/204* (2013.01)

(56) References Cited

U.S. PATENT DOCUMENTS

| | | |
|---|---|---|
| 2019/0326481 A1 | 10/2019 | Seibald et al. |
| 2021/0017448 A1 | 1/2021 | Toyoshima et al. |

FOREIGN PATENT DOCUMENTS

| | | |
|---|---|---|
| WO | 2019075469 A1 | 4/2019 |
| WO | 2019188319 A1 | 10/2019 |

OTHER PUBLICATIONS

German Search Report issued for the corresponding German application No. 10 2019 208 285.8, dated Mar. 16, 2020, 6 pages (for informational purposes only).

Pust P. et al.: "Narrow-band red-emitting Sr[LiAl3N4]:Eu2+ as a next-generation LED-phosphor material", Nature Materials, Sep. 2014, vol. 13, pp. 891-896.

* cited by examiner

YELLOW LUMINOPHORE AND LIGHT SOURCE

CROSS-REFERENCE TO RELATED APPLICATIONS

The present application is a national stage entry according to 35 U.S.C. § 371 of PCT application No.: PCT/EP2020/065505 filed on Jun. 4, 2020; which claims priority to German Patent Application Serial No.: 10 2019 208 285.8 filed on Jun. 6, 2019; all of which are incorporated herein by reference in their entirety and for all purposes.

TECHNICAL FIELD

The disclosure relates to a luminophore and to a light source that comprises the luminophore.

BACKGROUND

In conversion-based light sources, the yellow luminophore currently employed for the conversion of blue primary radiation from a light-emitting diode (LED) or laser diode to secondary radiation in the yellow spectral region is almost exclusively $Y_3Al_5O_{12}:Ce^{3+}$ (YAG). YAG crystallizes in the garnet structure in the cubic space group $Ia\bar{3}d$. YAG efficiently absorb radiation in the blue spectral region and emits in the yellow spectral region. Although YAG is very efficient in the conversion of the radiation, the yellow secondary radiation has a very high spectral half-height width ("full width at half maximum"—FWHM) of more than 100 nm.

There is a need for luminophores having emission in the yellow spectral region and a narrow spectral half-height width.

SUMMARY

It is an objective to specify a luminophore that emits radiation in the yellow-green to yellow spectral region and has a narrow spectral half-height width. It is a further objective to specify a light source comprising the luminophore described here and a use of the light source.

A luminophore is specified. The luminophore has the general empirical formula $XA_3AlO_4:E$ where X=Mg, Ca, Sr and/or Ba;
A=Li, Na, K, Rb and/or Cs and
E=Eu, Ce, Yb and/or Mn. E may be referred to as activator and is especially responsible for the emission of radiation from the luminophore.

Luminophores are described here and hereinafter using empirical formulae. In the empirical formulae specified, it is possible that the luminophore includes further elements, for instance in the form of impurities, where these impurities together may have a maximum proportion by weight in the luminophore of at most 1 permille or 100 ppm (parts per million) or 10 ppm.

Surprisingly, the luminophores, on excitation with primary radiation, show emission or secondary radiation with a peak or dominant wavelength in the yellow-green to yellow spectral region, and additionally show a narrow spectral half-height width (FWHM, full width at half maximum). The peak wavelength may range from 510 nm to 580 nm inclusive, such as from 510 nm to 530 nm inclusive, or from 560 nm to 580 nm inclusive. Spectral half-height width is understood here and hereinafter to mean the spectral width at half the height of the maximum emission peak or an emission band.

"Peak wavelength" in the present context refers to the wavelength in the emission spectrum of a luminophore with the maximum intensity in the emission spectrum or an emission band. An emission band or the emission spectrum of the luminophore here and hereinafter may have one or two emission peaks. If an emission band of the emission spectrum has two emission peaks, the emission band especially has two emission maxima, with the emission maximum having the greater intensity corresponding to the peak wavelength or roughly to the peak wavelength. If the two emission maxima are close to one another, as a result of superimposition, there can be a slight shift in the maximum of the overall band compared to the emission maximum of the emission peak having the greater intensity.

Dominant wavelength is a way of describing non-spectral (polychromatic) light mixtures in terms of spectral (monochromatic) light that creates a similar perception of shade. In the CIE color space, the line that connects a point for a particular color and the point CIE-x=0.333, CIE-y=0.333 can be extrapolated such that it meets the outline of the space at two points. The point of intersection closer to said color represents the dominant wavelength of the color as the wavelength of the pure spectral color at this point of intersection. The dominant wavelength is thus the wavelength perceived by the human eye.

In at least one embodiment, the emission or emission spectrum has one or two emission peaks. The emission peaks especially each have an emission maximum. It is especially possible here that the emission peaks are at least partly superimposed, resulting in one emission band which, according to the intensity of the two individual emission peaks, has one emission maximum or two emission maxima. It may be the case here that the emission maximum of the emission band are shifted with respect to the emission maxima of the individual emission peaks, i.e. lie at shorter or longer wavelengths.

In at least one embodiment, the emission or emission spectrum has two emission peaks. More particularly, the emission peaks are at least partly superimposed, so as to result in one emission band having one emission maximum corresponding to the peak wavelength, or two emission maxima corresponding to one emission maximum and a second emission maximum at roughly the peak wavelength. More particularly, an emission maximum in the emission band is between 510 nm and 530 nm inclusive and the peak wavelength of the emission band between 560 nm and 580 nm inclusive, or an emission maximum of the emission band is between 560 nm and 580 nm inclusive and the peak wavelength of the emission band between 510 nm and 530 nm inclusive. In a non-limiting embodiment, an emission maximum of the emission band is between 515 nm and 525 nm inclusive and the peak wavelength of the emission band between 565 nm and 575 nm inclusive, or an emission maximum of the emission band is between 565 nm and 575 nm inclusive and the peak wavelength of the emission band is between 515 nm and 525 nm inclusive. If the emission band has just one emission maximum, said maximum and hence the peak wavelength may range from 560 nm to 580 nm inclusive, or range from 510 nm to 530 nm inclusive, such as from 565 nm to 575 nm inclusive, or from 515 nm to 525 nm inclusive. Advantageously, the relative intensity of the two emission peaks can be adjusted via the synthesis conditions, such that it is possible to vary the color locus of the secondary radiation. More particularly, it is also possible that one emission peak is entirely suppressed or virtually entirely suppressed, and hence the emission spectrum has just one emission peak and hence the emission band corresponds to the emission peak.

In at least one embodiment, the emission or emission spectrum has an emission peak or consists of an emission peak. The peak wavelength ranges from 560 nm to 580 nm inclusive, such as from 565 nm to 575 nm inclusive, and hence in the yellow region of the electromagnetic spectrum.

In at least one embodiment, the emission band has a spectral half-height width below 90 nm, such as from 40 nm to 90 nm inclusive. If the emission band is composed of two emission peaks, the emission peaks may each have a spectral half-height width below 50 nm, such as from 40 nm to 50 nm inclusive.

In at least one embodiment, the emission or the emission spectrum has only one emission peak or consists of one emission peak. The spectral half-height width is between 40 nm and 50 nm, for example 46 nm. More particularly, the peak wavelength in this embodiment is between 560 nm and 580 nm inclusive, such as from 565 nm to 575 nm inclusive.

In at least one embodiment, the luminophore having the empirical formula $XA_3AlO_4$:E crystallizes in a triclinic crystal structure. The luminophore may crystallize in the triclinic space group $P\bar{1}$.

In at least one embodiment, E is at least Eu, such as at least $Eu^{2+}$. It is possible here to combine Eu or $Eu^{2+}$ with Ce, Yb and/or Mn. In a non-limiting embodiment, E=Eu or $Eu^{2+}$.

By using the activators Eu, Ce, Yb and/or Mn, especially Eu or Eu, in combination with Ce, Yb and/or Mn, it is possible to have particularly good control over the color locus of the luminophore in the CIE color space (1931), the peak wavelength ($\lambda_{peak}$) or dominant wavelength ($\lambda_{dom}$) thereof, and the spectral half-height width.

In a further embodiment, the activator E may be present in molar percentages between 0.1 mol % and 20 mol %, 1 mol % and 10 mol %, 0.5 mol % and 5 mol %, 2 mol % and 5 mol %. Excessively high concentrations of E can lead to a loss of efficiency via concentration quenching. Here and hereinafter, molar percentages for the activator E, especially Eu, may especially be regarded as molar percentages based on the molar proportions of X in the respective luminophore.

In at least one embodiment, the luminophore has the general empirical formula $(Sr_{1-x}X^*_x)A_3AlO_4$:E where
 $X^*$=Mg, Ba and/or Ca,
 A=Li, Na, K, Rb and/or Cs,
 E=Eu, Ce, Yb and/or Mn, and
 $0 \leq x \leq 1$, such as $0 \leq x < 1$, such as $0 \leq x \leq 0.5$, such as $0 \leq x \leq 0.3$.

By variation of the proportion of Sr in the luminophore, it is advantageously possible to influence the position of the peak wavelength. More particularly, the luminophores having a high strontium content have been found to be particularly efficient and stable for long period of time.

In at least one embodiment, the luminophore has the general empirical formula $SrA_3AlO_4$:E where
 A=Li, Na, K, Rb and/or Cs and
 E=Eu, Ce, Yb and/or Mn.

In at least one embodiment, the luminophore has the general empirical formula $(Sr_{1-x}X^*_x)Li_3AlO_4$:E where
 $X^*$=Mg, Ba and/or Ca,
 E=Eu, Ce, Yb and/or Mn, and
 $0 \leq x \leq 1$, such as $0 \leq x < 1$, such as $0 \leq x \leq 0.5$, such as $0 \leq x \leq 0.3$.

In at least one embodiment, the luminophore has the general empirical formula $SrLi_3AlO_4$:E where
 E=Eu, Ce, Yb and/or Mn, such as E=Eu.

In at least one embodiment, the luminophore is capable of absorbing primary radiation from the UV to blue spectral region and converting it to secondary radiation having a peak wavelength between 510 nm and 580 nm inclusive, such as from 510 nm to 530 nm inclusive or between 560 nm and 580 nm inclusive. The dominant wavelength, in the case of excitation with primary radiation from the UV to blue spectral region, may be in the range between 550 nm and 580 nm inclusive.

In at least one embodiment, the luminophore has the general empirical formula $SrLi_3AlO_4$:Eu. Eu is especially $Eu^{2+}$.

The luminophore $SrLi_3AlO_4$:Eu, on excitation with primary radiation from the UV to blue spectral region, emits secondary radiation with a peak wavelength in the yellow-green spectral region, especially between 535 nm and 545 nm inclusive or in the yellow spectral region, especially between 565 nm and 575 nm inclusive. The synthesis conditions can advantageously influence the emission spectrum. For instance, the emission or emission spectrum may have one or two emission peaks, which enables adjustment of the color locus. In the case of two emission peaks, it is possible to vary the intensity thereof. Surprisingly, the emission band consisting of one or two emission peaks of the luminophore has a very narrow spectral half-height width below 90 nm and hence a high light yield as a result of a large overlap with the human eye sensitivity curve having a maximum at 555 nm.

As a result, it is possible with the luminophore to provide particularly efficient light sources. The emission peaks here may each have a spectral half-height width below 50 nm.

The inventors have thus recognized that it is possible to provide a novel narrowband luminophore having a peak wavelength in the yellow-green to yellow region with advantageous properties that has been impossible to provide to date.

A further luminophore may have the general empirical formula $X'_{1-x}A'_y(Al_{1+z}A'_{3-z})O_4$:E' that crystallizes in a tetragonal crystal system and where
 X'=Mg, Ca, Sr and/or Ba;
 A'=Li, Na, K, Rb and/or Cs;
 E'=Eu, Ce, Yb and/or Mn;
 $0<x<0.25$;
 $y \leq x$ and
 $z=0.5(2x-y)$.

Surprisingly, the further luminophore, on excitation with primary radiation, also has emission or secondary radiation with a peak or dominant wavelength in the yellow-green to yellow spectral region, and additionally shows a narrow spectral half-height width (FWHM, full width at half maximum).

The notation of the empirical formula $X'_{1-x}A'_y(Al_{1+z}A'_{3-z})O_4$:E' in which A' is listed twice is common knowledge to a person skilled in the art in the field of inorganic chemistry. More particularly, this empirical formula illustrates to the person skilled in the art that the A' may occupy different positions within the crystal structure of the luminophore.

In at least one embodiment, the emission or emission spectrum of the further luminophore has one emission peak or consists of one emission peak.

In at least one embodiment, the further luminophore has the general empirical formula $X'_{1-x}Li_y(Al_{1+z}Li_{3-z})O_4$:E' where X'=Mg, Ca, Sr and/or Ba;
 E'=Eu, Ce, Yb and/or Mn;
 $0<x<0.25$;

y≤x and z=0.5(2x−y). An alternative notation of the general empirical formula $X'_{1-x}Li_y(Al_{1+z}Li_{3-z})O_4:E'$ is $X'_{1-x}Li_{y+3-z}Al_{1+z}O_4:E'$.

In at least one embodiment, the further luminophore has the general empirical formula $$Sr_{1-x}Li_y(Al_{1+z}Li_{3-z})O_4:E' \text{ where}$$

E'=Eu, Ce, Yb and/or Mn;

0<x<0.25;

y≤x and z=0.5(2x−y).

In at least one embodiment, for the further luminophore, x=y.

In at least one embodiment, for the further luminophore, 0.10<x<0.18.

In at least one embodiment, the further luminophore crystallizes in a tetragonal crystal structure. In a non-limiting embodiment, the luminophore crystallizes in the tetragonal space group I4/m.

In at least one embodiment, E' is at least Eu, such as at least $Eu^{2+}$. It is possible here to combine Eu or $Eu^{2+}$ with Ce, Yb and/or Mn. In a non-limiting embodiment, E'=Eu or $Eu^{2+}$.

The activator E' may, in a further embodiment, be present in molar percentages between 0.01 mol % and 20 mol %, 1 mol % and 10 mol %, 0.5 mol % and 5 mol %, 2 mol % and 5 mol %. Excessively high concentrations of E may lead to a loss of efficiency through concentration quenching. Here and hereinafter, molar percentages for the activator E', especially Eu, should especially be regarded as molar percentages based on the molar proportions of X' in the respective luminophore.

In at least one embodiment, the luminophore has the general empirical formula $Sr_{0.86}Li_{0.14}(Li_{2.93}Al_{1.07})O_4:Eu$. Eu is especially $Eu^{2+}$.

By comparison with $SrLi_3AlO_4:Eu$, the $AlO_4$ tetrahedron and the $LiO_4$ tetrahedron in $Sr_{0.86}Li_{0.14}(Li_{2.93}Al_{1.07})O_4:Eu$ are disordered. In addition, the Sr position is statistically underpopulated. This is compensated for by a slight excess of Al in the (Li, Al) $O_4$ tetrahedron and some additional Li in the channels.

A luminophore mixture may include the luminophore and the further luminophore. All details and definitions of the luminophore and of the further luminophore here are also applicable to the luminophore mixture.

In at least one embodiment, the luminophore mixture comprises the luminophore having the general empirical formula $SrLi_3AlO_4:E$ that crystallizes in a triclinic crystal system, where E=Eu and the further luminophore having the general empirical formula $Sr_{1-x}Li_y(Al_{1+z}Li_{3-z})O_4:E'$ that crystallizes in a tetragonal crystal system, where

E'=E;

0<x<0.25;

y≤x, such as x=y and z=0.5(2x−y).

In at least one embodiment, the luminophore mixture comprises the luminophore having the empirical formula $SrLi_3AlO_4:Eu$ that crystallizes in a triclinic crystal system, and the further luminophore $Sr_{0.86}Li_{0.14}(Li_{2.93}Al_{1.07})O_4:Eu$ that crystallizes in a tetragonal crystal system.

A light source may include the luminophore, the further luminophore or the luminophore mixture. All details and definitions of the luminophore, of the further luminophore and of the luminophore mixture are also applicable to the light source, and vice versa.

In at least one embodiment, the light source has a primary radiation source. The primary radiation source may be a semiconductor light source, such as a light-emitting diode (LED) or a laser diode. The primary radiation source is set up to emit electromagnetic primary radiation.

In combination with the luminophore present in the light source or the luminophore mixture, the light source may be set up to emit yellow or yellow-green light in full conversion or white light in partial or full conversion. As a result of the high overlap of the secondary radiation from the luminophore, the further luminophore or the luminophore mixture with the eye sensitivity curve, the light source has a high light yield of the overall radiation.

In at least one embodiment, the light source has a conversion element. More particularly, the conversion element comprises the luminophore, the further luminophore or the luminophore mixture, or consists of the luminophore, the further luminophore or the luminophore mixture. The luminophore, the further luminophore or the luminophore mixture at least partly or fully converts the electromagnetic primary radiation to electromagnetic secondary radiation. The peak wavelength of the secondary radiation is especially between 510 nm and 580 nm inclusive and hence in the yellow-green to yellow region of the electromagnetic spectrum.

In at least one embodiment, the conversion element is a rotatable luminophore wheel. The luminophore wheel is especially rotatable about an axis of rotation and may, for example, be in a circular or annular shape. A rotation frequency or speed may, for example, be between 1 Hz and 200 Hz.

In at least one embodiment, the conversion element, especially the rotatable luminophore wheel, is arranged spaced apart from the primary radiation source. In other words, the conversion element is not in direct mechanical contact with the primary radiation source.

In at least one embodiment, the conversion element, especially the rotatable luminophore wheel, is arranged spaced apart from a laser diode. In other words, the conversion element is not in direct mechanical contact with the laser diode. The light source in this embodiment is especially a laser activated remote phosphor (LARP) system. Such systems are especially suitable for projectors and displays.

A use of the light source in a projector or a display is specified. More particularly, the conversion element takes the form of a rotatable luminophore wheel, and the light source is a LARP system.

In at least one embodiment, the conversion element or light source does not include any further luminophore aside from the luminophore, the further luminophore or the luminophore mixture. The conversion element may also consist of the luminophore, the further luminophore or the luminophore mixture. The luminophore, the further luminophore or the luminophore mixture may be set up for full conversion of the primary radiation. The overall radiation from the light source in this embodiment is in the yellow-green to yellow region of the electromagnetic spectrum.

In at least one embodiment, the overall radiation from the light source is a white mixed radiation. The light source that emits white mixed radiation may contain no further luminophore aside from the luminophore, the further luminophore or the luminophore mixture. The luminophore, the further luminophore or the luminophore mixture is set up for partial conversion of the primary radiation. For this purpose, the peak wavelength of the primary radiation may be indivisible blue spectral region, for example between 400 nm and 460 nm. Superimposition of the blue primary radiation and the yellow-green to yellow secondary radiation results in white overall radiation from the light source. In the case of use of the luminophore or the further luminophore, this is what is called a one-luminophore solution. Such light sources may especially find use in general lighting and in the automotive sector, especially in motor vehicle headlights or turn signal lamps.

In at least one embodiment, the conversion element has a second and/or third luminophore as well as the luminophore, the further luminophore or the luminophore mixture. The conversion element may comprise further luminophores as well as the luminophore, the further luminophore or the luminophore mixture and the second and third luminophores. For example, the luminophores are embedded in a matrix material. Alternatively, the luminophores may also be present in a converter ceramic.

The light source may include a second luminophore for emission of radiation from the green spectral region.

Additionally or alternatively, the light source may include a third luminophore. The third luminophore may be set up to emit radiation from the red spectral region. In other words, the light source may then include at least three luminophores: the green-yellow- to yellow-emitting luminophore, a red-emitting luminophore and a green-emitting luminophore, or the light source may include at least the luminophore mixture, a red-emitting luminophore and a green-emitting luminophore. The light source is set up for full conversion or partial conversion, such as with the primary radiation in the case of full conversion selected from the UV to blue spectral region, and in the case of partial conversion from the blue region. The resulting overall radiation from the light source is then especially white mixed radiation.

A second and/or third luminophore present in addition to the luminophore, the further luminophore or the luminophore mixture may especially increase the color rendering index (CRI). Further luminophores in addition to the second and third luminophore are especially not ruled out here. The higher the color rendering index, the truer or truer to nature the color impression perceived.

A floodlight may include the light source. All details and definitions of the light source are applicable here to the floodlight, and vice versa.

A floodlight is specified. The floodlight comprises a light source. The light source includes at least one primary radiation source and a conversion element comprising the luminophore, the further luminophore or the luminophore mixture. The primary radiation source may be a laser diode.

In at least one embodiment, the floodlight is a motor vehicle headlight.

In at least one embodiment, the floodlight is used for general lighting, exterior lighting, security lighting, specialty lighting or stage lighting.

Working Examples

One working example AB1 of the inventive luminophore having the empirical formula $SrLi_3AlO_4:Eu^{2+}$ was prepared as follows: SrO, $Li_2CO_3$, $Al_2O_3$ and $Eu_2O_3$ were mixed, and the mixture was calcined in a nickel crucible at 800° C. in a gas pressure sintering furnace under a 10 bar nitrogen atmosphere for 20 h. After cooling down to room temperature, a single crystal of the luminophore AB1 was isolated and characterized. AB1, on excitation with blue primary radiation, emits yellow light having a dominant wavelength $\lambda_{dom}$=568 nm. The peak wavelength $\lambda_{peak}$ is 566 nm. The spectral half-height width of the emission band is 46 nm. It has been found that, as well as the luminophore $SrLi_3AlO_4$: $Eu^{2+}$ (AB1), there was also formation of the luminophore $Sr_{0.86}Li_{0.14}(Li_{2.93}Al_{1.07})O_4$:Eu (AB1'). For AB1' too, a single crystal of the luminophore was isolated and characterized. The crystals of the luminophores AB1 and AB1' in the resultant luminophore mixture are distinguishable and separable by x-ray diffraction experiments and by their crystal structure. By virtue of their separability, AB1 and AB1' can each be used separately from one another. It is also possible to use the luminophore mixture of AB1 and AB1'.

The starting weights of the synthesis reactants for AB1 and AB1' can be found in table 1 below.

TABLE 1

| Reactant | Mass/g |
| --- | --- |
| SrO | 14.47 g |
| $Li_2CO_3$ | 17.20 g |
| $Al_2O_3$ | 7.91 g |
| $Eu_2O_3$ | 0.41 g |

One working example AB2 of the inventive luminophore with the empirical formula $SrLi_3AlO_4:Eu^{2+}$ was prepared as follows: SrO, $Li_2O$, $Al_2O_3$ and EuN were mixed, and the mixture was calcined at 800° C. in a flow furnace under a 10% hydrogen-containing forming gas atmosphere for 20 h. after cooling to room temperature, a single crystal of the luminophore was isolated and characterized. On excitation with blue primary radiation, AB2 emits yellow-green light with a dominant wavelength $\lambda_{dom}$=555 nm. The peak wavelength is 521 nm. The spectral half-height width of the emission band is 85 nm.

The starting weights of the reactants for AB2 can be found in table 2 below.

TABLE 2

| Reactant | Mass/g |
| --- | --- |
| SrO | 5.132 g |
| $Li_2O$ | 2.220 g |
| $Al_2O_3$ | 2.525 g |
| EuN | 0.123 g |

The reactants for the luminophore are commercially available, very substantially stable, easy to handle and additionally very inexpensive.

Table 3 below shows crystallographic data of $SrLi_3AlO_4$: $Eu^2$ (AB1) The luminophore crystallizes in the triclinic crystal system in the $P\bar{1}$ space group.

TABLE 3

| | |
| --- | --- |
| Empirical formula | $SrLi_3AlO_4$: $Eu^{2+}$ |
| Molar mass | 199.42 g/mol |
| Z | 4 |
| Structure type | $SrLiAl_3N_4$ |
| Crystal system | triclinic |
| Space group | $P\bar{1}$ |
| Lattice parameters | |
| a/pm | 575.15 (2) |
| b/pm | 732.68 (2) |
| c/pm | 971.96 (3) |
| α/° | 83.978 (1) |
| β/° | 76.647 (1) |
| γ/° | 79.625 (1) |

TABLE 3-continued

| | |
|---|---|
| Volume/nm³ | 0.39114 (1) |
| Crystallographic density ρ/g cm⁻³ | 3.39 |
| T/K | 296 (2) |
| Diffractometer | BRUKER D8 Quest |
| Radiation | Cu-Kα (λ = 154.178 nm) |
| Measurement range | 4.686 < θ < 68.171 |
| Total reflections | 10034 |
| Measured/independent reflections | 10567/1406 |
| Measured reciprocal space | −6 ≤ h ≤ 6; −8 ≤ k ≤ 8; −11 ≤ l ≤ 11 |
| $R_{all}$/w$R_{ref}$ | 2.42%/5.66% |
| GoF | 1.123 |

Tables 4a and 4b below show crystallographic position parameters of $SrLi_3AlO_4$:$Eu^{2+}$ (AB1)

TABLE 4a

| Name | Atom type | Wyckoff position | x | y | z |
|---|---|---|---|---|---|
| Sr01 | Sr | 2i | 0.53212 (6) | 0.63473 (4) | 0.62467 (3) |
| Sr02 | Sr | 2i | 0.50901 (6) | 0.12019 (5) | 0.11643 (4) |
| Al03 | Al | 2i | 0.95879 (18) | 0.28802 (14) | 0.13445 (11) |
| Al04 | Al | 2i | 0.33910 (18) | 0.80331 (14) | 0.34593 (11) |
| O005 | O | 2i | 0.1553 (5) | 0.6605 (4) | 0.4630 (3) |
| O006 | O | 2i | 0.8319 (4) | 0.1159 (4) | 0.2601 (3) |
| O007 | O | 2i | 0.3401 (4) | 0.8044 (3) | 0.1635 (3) |
| O008 | O | 2i | 0.6906 (4) | 0.4255 (3) | 0.0997 (3) |
| O009 | O | 2i | 0.3268 (5) | 0.3030 (4) | 0.3954 (3) |
| O00A | O | 2i | 0.1432 (5) | 0.1602 (4) | 0.9935 (3) |
| O00B | O | 2i | 0.1416 (5) | 0.3831 (4) | 0.2224 (3) |
| O00C | O | 2i | 0.6382 (4) | 0.6892 (4) | 0.3577 (3) |
| Li0D | Li | 2i | 0.6982 (13) | 0.6717 (10) | 0.1474 (7) |
| Li0E | Li | 2i | 0.9473 (12) | 0.5500 (10) | 0.3725 (7) |
| Li0F | Li | 2i | 0.0235 (12) | 0.1777 (9) | 0.3871 (7) |
| Li0G | Li | 2i | 0.6964 (12) | 0.9419 (9) | 0.4012 (7) |
| Li0H | Li | 2i | 0.3144 (14) | 0.5625 (10) | 0.0995 (8) |
| Li0I | Li | 2i | 0.0339 (12) | 0.9284 (9) | 0.1284 (7) |

TABLE 4b

| Name | Occupation | $U_{iso}$ |
|---|---|---|
| Sr01 | 1 | 0.0082 (2) |
| Sr02 | 1 | 0.0108 (2) |
| Al03 | 1 | 0.0038 (2) |
| Al04 | 1 | 0.0035 (2) |
| O005 | 1 | 0.0079 (5) |
| O006 | 1 | 0.0062 (5) |
| O007 | 1 | 0.0060 (5) |
| O008 | 1 | 0.0066 (5) |
| O009 | 1 | 0.0066 (5) |
| O00A | 1 | 0.0069 (5) |
| O00B | 1 | 0.0068 (5) |
| O00C | 1 | 0.0063 (5) |
| Li0D | 1 | 0.0144 (14) |
| Li0E | 1 | 0.0118 (13) |
| Li0F | 1 | 0.0103 (13) |
| Li0G | 1 | 0.0116 (13) |
| Li0H | 1 | 0.0171 (15) |
| Li0I | 1 | 0.0120 (13) |

The crystal structure and the crystallographic data shown in tables 4a and 4b were determined by x-ray diffraction experiments on single crystals of the luminophore. As apparent from tables 4a and 4b, the crystal structure has two crystallographically different Sr atoms (Sr01, Sr02), two crystallographically different Al atoms (Al03, Al04), six crystallographically different Li atoms (Li0D, Li0E, Li0F, Li0G, Li0H, Li0I) and eight crystallographically different O atoms (O005, O006, O007, O008, O009, O00A, O00B, O00C).

Table 5 below shows crystallographic data of $Sr_{0.86}Li_{0.14}$ $(Li_{2.93}Al_{1.07})O_4$:$Eu^{2+}$ (AB1'). The luminophore crystallizes in the tetragonal crystal system in the I4/m space group.

TABLE 5

| | |
|---|---|
| Empirical formula | $Sr_{0.86}Li_{0.14}$ ($Li_{2.93}Al_{1.07}O_4$) |
| Formula mass/g mol⁻¹ | 379.06 |
| Z | 1 |
| Structure type | $UCr_4C_4$ |
| Crystal system | tetragonal |
| Space group | I4/m |
| Lattice parameters | |
| a | 782.8 (1) pm |
| c | 318.00 (5) pm |
| Volume V | 0.19487 (6) nm³ |
| Crystallographic density ρ/g cm⁻³ | 3.258 |
| T/K | 296 (2) |
| Diffractometer | BRUKER D8 Quest |
| Radiation | Cu K$_α$ (154.178 nm) |
| Measurement range | 8.01 ≤ θ ≤ 59.3 |
| Measured/independent reflections | 924/89 |
| Measured reciprocal space | −8 ≤ h ≤ 8; −8 ≤ k ≤ 8; −3 ≤ l ≤ 3 |
| $R_{all}$/w$R_{ref}$ | 2.30%/5.93% |
| GoF | 1.184 |

Table 6 below shows crystallographic position parameters of $Sr_{0.86}Li_{0.14}(Li_{2.93}Al_{1.07})O_4$:$Eu^{2+}$ (AB1')

TABLE 6

| Name | Atom type | x | y | z | Occupation | $U_{iso}$ |
|---|---|---|---|---|---|---|
| Sr01 | Sr | 0.5 | 0.5 | 0.5 | 0.861(11) | 0.0230(5) |
| Al02 | Al | 0.1953(9) | 0.6509(10) | 0 | 0.2670(19) | 0.0092(16) |
| Li02 | Li | 0.165(2) | 0.636(2) | 0 | 0.7330(19) | 0.0092(16) |
| O03 | O | 0.2427(5) | 0.4094(4) | 0 | 1 | 0.0201(13) |
| Li04 | Li | 0.5 | 0.5 | 0 | 0.139(11) | 0.05 |

BRIEF DESCRIPTION OF THE DRAWINGS

Further advantageous embodiments and developments are apparent from the working examples described hereinafter in conjunction with the figures.

DETAILED DESCRIPTION

Figure 1:
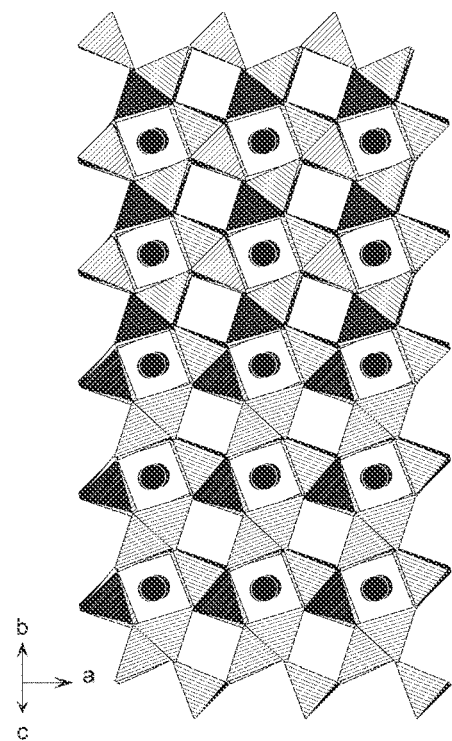
FIG. 1 shows a detail of the crystal structure of the luminophore.

FIG. 1 shows a detail of the crystal structure (monoclinic, P1̄ space group) of the inventive luminophore of the formula $SrLi_3AlO_4$:$Eu^{2+}$. The crystal structure was determined by means of single-crystal x-ray diffraction. The lattice parameters, crystallographic data and the quality parameters of the x-ray determination can be found in table 3, and the crystallographic position parameters of the refined structures in tables 4a and 4b. The crystal structure of the luminophore corresponds to that of $Sr[LiAl_3N_4]$:$Eu^{2+}$ (Pust, P. et al. Narrow-band red-emitting $Sr[LiAl_3N_4]$:$Eu^{2+}$ as a next-generation LED-phosphor material. Nat. Mater. (2014)). In FIG.

1, filled circles represent Sr, hatched tetrahedra represent LiO$_4$ tetrahedra, and filled tetrahedra represent AlO$_4$ tetrahedra. In the tetrahedra, there are oxygen atoms at each of the vertices, and Al or Li in the center of the tetrahedra.

Figure 2:
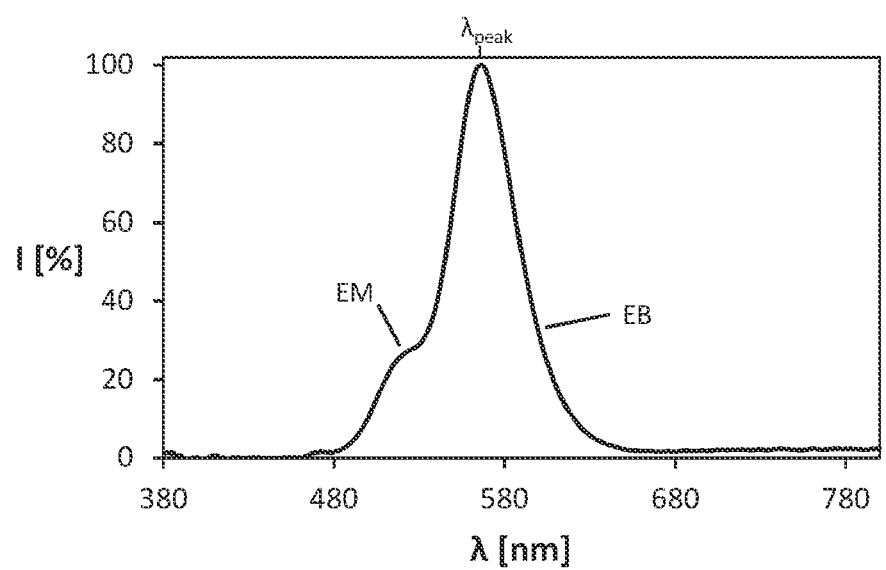
FIGS. 2, 3, 4, 5, 6, 7, 8 show emission spectra.

FIG. 2 shows the emission spectrum of the luminophore SrLi$_3$AlO$_4$:Eu$^{2+}$ (AB1). Plotted on the x axis is the wavelength in nanometers, and on the y axis the relative intensity in percent. On excitation with blue primary radiation, the luminophore emits yellow secondary radiation with a dominant wavelength $\lambda_{dom}$=568 nm and a peak wavelength $\lambda_{peak}$=566 nm. As well as the peak wavelength, the emission band EB has an emission maximum EM. The spectral half-height width of the emission band is 46 nm.

Figure 3:
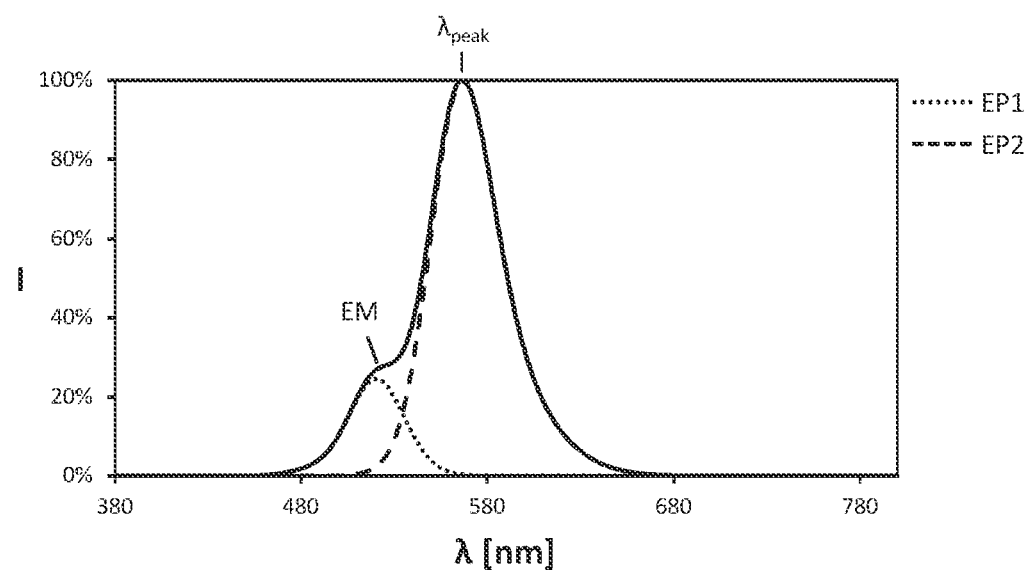

FIG. 3, like FIG. 2, shows the emission spectrum of the luminophore SrLi$_3$AlO$_4$:Eu$^{2+}$ (AB1). It becomes clear here that the emission band EB results from a partial overlap of two emission peaks EP1 and EP2. EP1 has a lower intensity than EP2. The resulting emission band EB has an emission maximum EM resulting from EP1 and a further emission maximum corresponding roughly to the peak wavelength resulting from EP2. The emission maximum of EP1 is about 520 nm, the emission maximum of EP2 about 570 nm. The spectral half-height width of EP1 is about 40 nm, that of EP2 about 46 nm.

Figure 4:
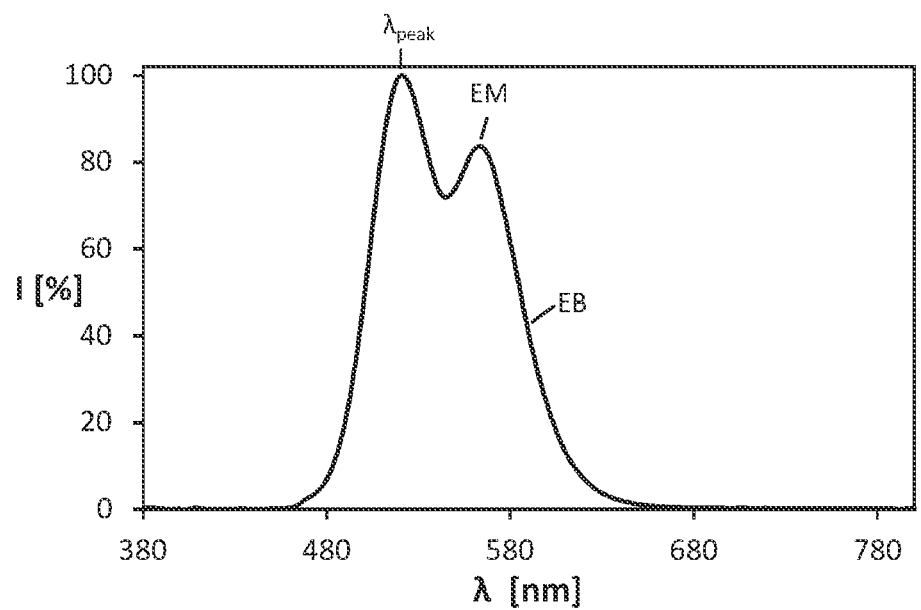

FIG. 4 shows the emission spectrum of the luminophore SrLi$_3$AlO$_4$:Eu$^{2+}$ (AB2). On excitation with blue primary radiation, the luminophore emits yellow secondary radiation having a dominant wavelength $\lambda_{dom}$=555 nm and a peak wavelength $\lambda_{peak}$=521 nm. As well as the peak wavelength, the emission band has an emission maximum EM. The spectral half-height width of the emission band is 85 nm.

Figure 5:
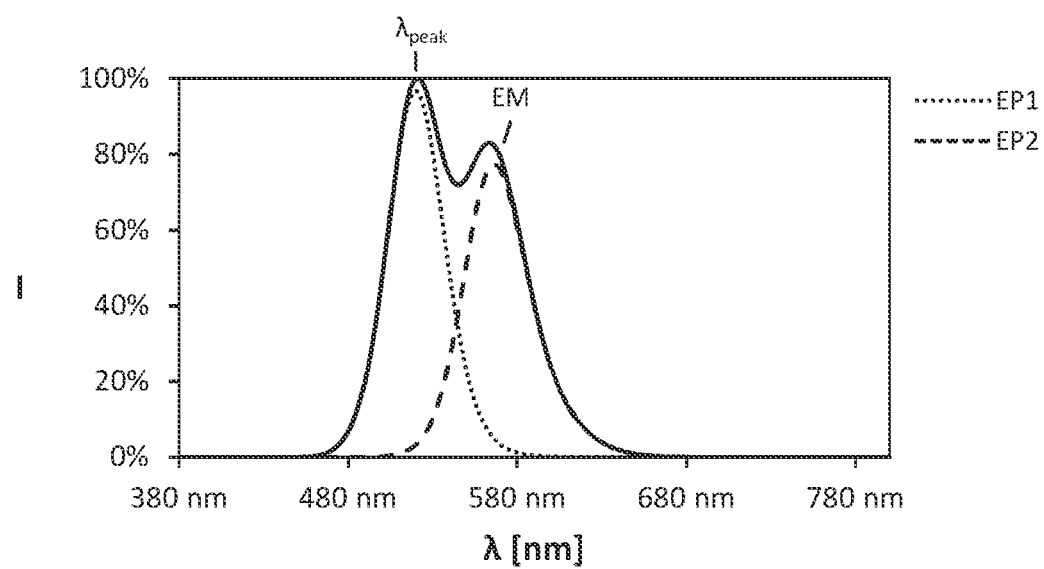

FIG. 5, like FIG. 4, shows the emission spectrum of the luminophore SrLi$_3$AlO$_4$:Eu$^{2+}$ (AB2). It becomes clear here that the emission band EB results from a partial overlap of two emission peaks EP1 and EP2. EP2 has lower intensity than EP1. The resulting emission band EB has an emission maximum EM resulting from EP2 and a further emission maximum corresponding roughly to the peak wavelength $\lambda_{peak}$ resulting from EP1. As is clearly apparent in the emission spectrum, the emission maximum EM of the emission band is shifted to a slightly shorter wavelength compared to the emission maximum of the emission peak EP2, while the peak wavelength $\lambda_{peak}$ of the emission band is shifted to a slightly longer wavelength compared to the emission maximum of the emission peak EP1. The emission maximum of EP1 is about 520 nm, the emission maximum of EP2 about 570 nm. The spectral half height width of EP1 is about 40 nm, that of EP2 about 46 nm.

A comparison with the emission spectrum of AB1 from FIG. 3 shows that, for AB1, the intensity of EP1 is lower than that of EP2, whereas, for AB2, the intensity of EP2 is lower than that of EP1. The emission spectra of AB1 and AB2 of FIGS. 2 to 5 thus show that the ratio of the emission peaks EP1 and EP2 to one another is variable, and at least the emission peak EP1 can be suppressed completely or virtually completely (see FIGS. 2 and 3). The emission band of AB1 therefore nearly corresponds to the emission peak EP2.

The inventors have thus surprisingly succeeded in providing a luminophore having a peak length within a range between 510 nm and 530 nm inclusive or between 560 and 580 nm inclusive. The position of the peak wavelength depends on the relative intensity of the two emission peaks of the emission band, it being possible by variation of the synthesis conditions for the emission peak EP1 in particular to have a very low intensity or be suppressed completely.

Figure 6:
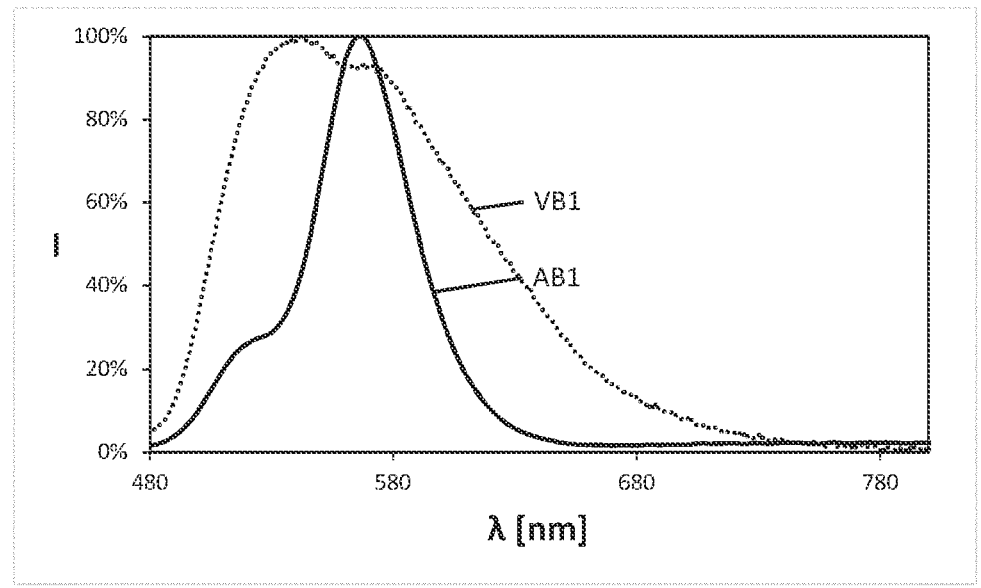

FIG. 6 shows a comparison of the emission spectrum of AB1 with that of the luminophore Y$_3$Al$_5$O$_{12}$:Ce$^{3+}$ (VB1). VB1, measured by the dominant wavelength $\lambda_{dom}$, has a comparable color impression to the inventive luminophore AB1.

Figure 7:
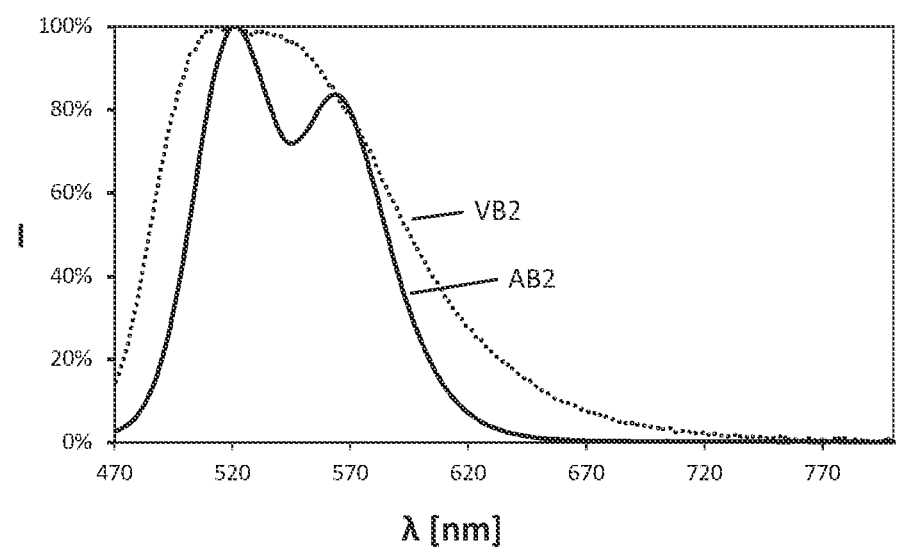

FIG. 7 shows a comparison of the emission spectrum of AB2 with that of the luminophore Lu$_3$Al$_5$O$_{12}$:Ce$^{3+}$ (VB2). VB2, measured by the dominant wavelength $\lambda_{dom}$, has a comparable color impression to the inventive luminophore AB2.

As is clearly apparent from FIGS. 6 and 7, the working examples AB1 and AB2 have much lower spectral half-height widths than the corresponding comparative examples VB1 and VB2. In both cases, this lower spectral half-height width leads to a distinct increase in luminous efficacy of radiation (LER), as can be seen from the relative light yield $$\frac{\eta_v(\text{working example})}{\eta_v(\text{comparative example})}$$

shown in table 7.

TABLE 7

| Luminophore | $\lambda_{dom}$ | FWHM | $LER = \frac{\eta_v(\text{working example})}{\eta_v(\text{comparative example})}$ |
|---|---|---|---|
| VB1: Y$_3$Al$_5$O$_{12}$ | 567 nm | 46 nm | 100% |
| AB1: SrLi$_3$AlO$_4$:Eu$^{2+}$ | 568 nm | 116 nm | 122% |
| VB2: Lu$_3$Al$_5$O$_{12}$ | 555 nm | 85 nm | 100% |
| AB2: SrLi$_3$AlO$_4$:Eu$^{2+}$ | 555 nm | 110 nm | 120% |

This increase by about 20% in the light yield of the working examples of the luminophore is directly advantageous for most conversion-based light sources. Used as a single luminophore in a full conversion solution, this elevated light yield corresponds to the gain in efficiency of the conversion solution when the luminophores are used.

These distinct advantages extend not just to full conversion applications with just a single luminophore. As part of a conversion solution with multiple luminophores (e.g. white light-emitting light sources), the gain in efficiency by virtue of the luminophore can still lead to distinct improvements. However, exact size of the gain in efficiency in a mixture also depends on the other luminophores in the mixture.

Figure 8:
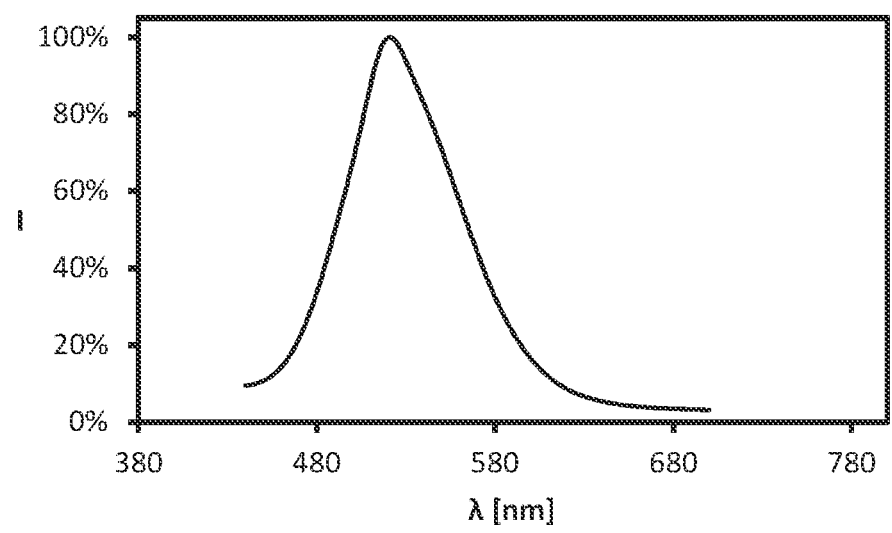

FIG. 8 shows the emission spectrum of the luminophore Sr$_{0.86}$Li$_{0.14}$(Li$_{2.93}$Al$_{1.07}$)O$_4$:Eu$^{2+}$ (AB1'). Plotted on the x axis is the wavelength in nanometers, and on the y axis the relative intensity in percent.

The working examples described in conjunction with the figures and the features thereof can also be combined with one another in further working examples, even if such combinations are not shown explicitly in the figures. In addition, the working examples described in conjunction with the figures may have additional or alternative features according to the description in the general part.

LIST OF REFERENCE NUMERALS

EP1 emission peak
EP2 emission peak
EB emission band
EM emission maximum
LED light-emitting diode
LER light yield FWHM half-height width
$\lambda_{dom}$ dominant wavelength
$\lambda_{peak}$ peak wavelength
AB working example
VB comparative example
g grams
I intensity
mol % mole percent
nm nanometers
° C. degrees Celsius

The invention claimed is:

1. A luminophore having the general empirical formula $X'_{1-x}A'_y(Al_{1+z}A'_{3-z})O_4$:E' that crystallizes in a tetragonal crystal system;
wherein:
X' is selected from the group consisting of Mg, Ca, Sr, Ba, and combinations thereof;
A' is selected from the group consisting of Li, Na, K, Rb, Cs, and combinations thereof;
E' is selected from the group consisting of Eu, Ce, Yb, Mn, and combinations thereof;
$0<x<0.25$;
$y<x$; and
$z=0.5(2x-y)$.

2. The luminophore as claimed in claim 1, wherein the luminophore has the general empirical formula $X'_{1-x}Li_y(Al_{1+z}Li_{3-z})O_4$:E'.

3. The luminophore as claimed in claim 1, wherein the luminophore has the general empirical formula $Sr_{1-x}Li_y(Al_{1+z}Li_{3-z})O_4$:E'.

4. The luminophore as claimed in claim 1, wherein x=y.

5. The luminophore as claimed in claim 1, wherein $0.10<x<0.18$.

6. The luminophore as claimed in claim 1, wherein the luminophore crystallizes in the tetragonal space group I4/m.

7. A luminophore mixture comprising:
a luminophore having the general empirical formula $XA_3AlO_4$:E that crystallizes in a triclinic crystal system,
wherein:
X is selected from the group consisting of Mg, Ca, Sr, Ba, and combinations thereof;
A is selected from the group consisting of Li, Na, K, Rb, Cs, and combinations thereof; and
E is selected from the group consisting of Eu, Ce, Yb, Mn, and combinations thereof; and
a luminophore having the general empirical formula $X'_{1-x}A'_y(Al_{1+z}A'_{3-z})O_4$:E' that crystallizes in a tetragonal crystal system,
wherein:
X' is selected from the group consisting of Mg, Ca, Sr, Ba, and combinations thereof;
A' is selected from the group consisting of Li, Na, K, Rb, Cs, and combinations thereof;
E' is selected from the group consisting of Eu, Ce, Yb, Mn, and combinations thereof;
$0<x<0.2$;
$y \leq x$; and
$z=0.5(2x-y)$.

8. A light source comprising a luminophore as claimed in claim 1.

9. The light source as claimed in claim 8, further comprising:
at least one primary radiation source configured to emit electromagnetic primary radiation; and
a conversion element comprising the luminophore; and
wherein the conversion element is configured to at least partially convert the electromagnetic primary radiation to electromagnetic secondary radiation.

10. The light source as claimed in claim 9, wherein the light source is configured to emit a white overall radiation or to emit a yellow overall radiation.

11. The light source as claimed in claim 8, wherein the at least one primary radiation source is a light-emitting diode or a laser diode.

12. The light source as claimed in claim 11, wherein the primary radiation source is a laser diode.

13. The light source as claimed in claim 12, wherein the conversion element is a rotatable luminophore wheel.

14. A floodlight comprising a light source as claimed in claim 12.

15. The floodlight as claimed in claim 14, wherein the floodlight is a motor vehicle headlight.

16. The floodlight as claimed in claim 14; wherein the floodlight is arranged in general lighting, exterior lighting, security lighting, stage lighting, or specialty lighting.

17. The light source as claimed in claim 8; wherein the light source is arranged in a display or projector.

18. A light source comprising a luminophore as claimed in claim 7.

* * * * *

UNITED STATES PATENT AND TRADEMARK OFFICE
CERTIFICATE OF CORRECTION

| | | |
|---|---|---|
| PATENT NO. | : 11,920,071 B2 | |
| APPLICATION NO. | : 17/616689 | |
| DATED | : March 5, 2024 | |
| INVENTOR(S) | : Daniel Bichler et al. | |

It is certified that error appears in the above-identified patent and that said Letters Patent is hereby corrected as shown below:

In the Claims

In Claim 1, in Column 13, Line 23 please change "y<s" to -- $y \leq x$ --

Signed and Sealed this
Twenty-third Day of April, 2024

*Katherine Kelly Vidal*
Katherine Kelly Vidal
*Director of the United States Patent and Trademark Office*